United States Patent [19]
Richard

[11] Patent Number: 5,363,941
[45] Date of Patent: Nov. 15, 1994

[54] HUNTER'S TREE STAND

[76] Inventor: Roger Richard, 105 Arthur La., Hackberry, La. 70645

[21] Appl. No.: 164,816

[22] Filed: Dec. 10, 1993

[51] Int. Cl.⁵ ........................................... A01M 31/02
[52] U.S. Cl. .................................. 182/187; 182/188; 108/152
[58] Field of Search ................ 182/187, 188, 133–136; 108/152

[56] References Cited

U.S. PATENT DOCUMENTS

| | | | |
|---|---|---|---|
| 2,808,975 | 10/1957 | Palmquist | 182/206 X |
| 3,493,080 | 2/1970 | Ehlert | 182/187 |
| 4,150,733 | 4/1979 | Plummer . | |
| 4,549,635 | 10/1985 | Early | 182/187 |
| 4,582,165 | 4/1986 | Latini | 182/187 |
| 4,597,473 | 7/1986 | Peck . | |
| 4,942,942 | 7/1990 | Bradley | 182/187 |
| 4,995,475 | 2/1991 | Berkbuegler . | |
| 4,997,063 | 3/1991 | Bradley . | |
| 5,052,516 | 11/1991 | Jamieson . | |
| 5,090,506 | 2/1992 | Womack et al. . | |
| 5,143,177 | 9/1992 | Smith . | |

Primary Examiner—Alvin C. Chin-Shue
Attorney, Agent, or Firm—Robert Montgomery

[57] ABSTRACT

An improvement in hunting tree stands which allows for the adaptation of such devices to trees or other support members which may not be truly vertical, thereby providing a level platform and/or seat arrangement irrespective of the orientation of the tree or support member. Leveling is accomplished by a telescopic arrangement attached to the standing platform thereby eliminating the need for ridged braces.

14 Claims, 5 Drawing Sheets

HUNTER'S TREE STAND

BACKGROUND OF THE INVENTION

1. Field of the Invention

The present invention relates to hunter's tree stands in general, and more particular to an improvement which allows for the adaptation of such devices to trees or other support members which may not be truly vertical, thereby providing a level platform and/or seat arrangement irrespective of the orientation of the tree or support member.

2. General Background

The prior art comprises many hunting stand devices for attachment to trees which provide elevated observation platforms. Such devices fall into two distinctive groups. The first consists of those stands which are considered to be climbing stands, and the second consist of stands attached to the tree by a belt called hang-on stands. The former, as exemplified by U.S. Pat. No. 4,997,063 to Bradley and U.S. Pat. No. 5,052,516 to Jamieson, utilizes a vee-shaped blade on the far side of a tree trunk and a vee-notch in the platform's frame on the near side, which can be used to climb a tree when used in conjunction with a foot rest or a seat portion having a similar design. However, this design is limited to trees with no low limbs. This design usually allows for adjustment to compensate for changes in tree diameter with limited level control obtained by adjusting the side braces. The side braces, although adjustable, must be ridged, thereby restricting collapsibility and compactness. Ridged braces and turn buckles also add considerable weight to the structure.

Strap or belted type hang-on stands, as exemplified by U.S. Pat. No. 5,143,177 to Smith, are usually associated with collapsible stands having a seat arrangement, usually pivotal with the base frame. The belt serves to secure the seat support to the tree trunk while the lower frame or standing platform is provided with a vee slot which pivots toward the tree when weight is applied to the stand. The standing platform is supported by cable braces which allow the vertical seat support to fold flat against the frame in a compact manner. Leveling of the platform is somewhat limited as a result of the flexible cable supports. Leveling is further limited due to the seat support being strapped to the tree. This necessitates that the seat and standing platform be independently adjusted for non-vertical trees.

In either of the above cases, trees or supports are usually chosen because of the their lack of low limbs or for their straightness. In some cases, however, the ideal location has very small trees or crooked trees with low limbs. As a result, the hunter is limited in range and field.

SUMMARY OF THE PRESENT INVENTION

The present invention solves the problem of leveling or adjusting the incline of a hunting stand with respect to inclined trees, thus opening up new vantage points to the hunter. This invention, although directed primarily at tree stands having seats, can be utilized with stands without seats or with such chair apparatus having separate foot rest. In some cases, the present invention can be adapted to replace the normally existing vee notch forming the average stand's contact point with the tree. In such cases, the standing platform's frame is fitted with a telescopically adjusted vee bar. When used with hang-on type stands fitted with seats, this allows the angle between the standing platform and the seat support post to remain constant, even with flexible side braces. In this situation, the tree contact point is adjacent to the seat and is secured as usual with its belt or strap. The lower standing platform is pivoted into the down position and the telescopic vee-bar is extended until the whole frame structure including the seat is brought into level condition with the ground irrespective of the inclination of the tree or support structure. This arrangement works equally well with trees leaning toward the stand or away from it. The process is even simpler when used for "climbing type" stands. Adjustment of a telescopic vee bar below the platform facilitates leveling without repositioning the vee-shaped blade on the opposite side of the tree or adjusting the support bracing.

Therefore, it is an object of the present invention to provide a tree stand having a leveling means with a wide range of adjustment irrespective of the diameter of the tree.

Another object of the invention is to provide an adjustable means for adaptation to almost any type tree stand.

A further object is to provide leveling means without the use of ridged side braces.

It is still a further object of the invention to provide a large, lightweight, compact, comfortable platform having a visual and operative means for leveling irrespective of the inclination or diameter of the support column.

Another object of the present invention is to provide an improvement for the above described hunting stands which allows such stands to be leveled over a wide range irrespective of the tree's inclination.

It is a further object of the present invention to provide a tree stand apparatus whereby the seat and stand can be leveled as a composite unit with respect to the ground irrespective of the tree's inclination.

It is another object of the present invention to provide a visual apparatus located on such stands indicative of the stand's inclination

DETAILED DESCRIPTION OF THE PREFERRED EMBODIMENT

Figure 1:
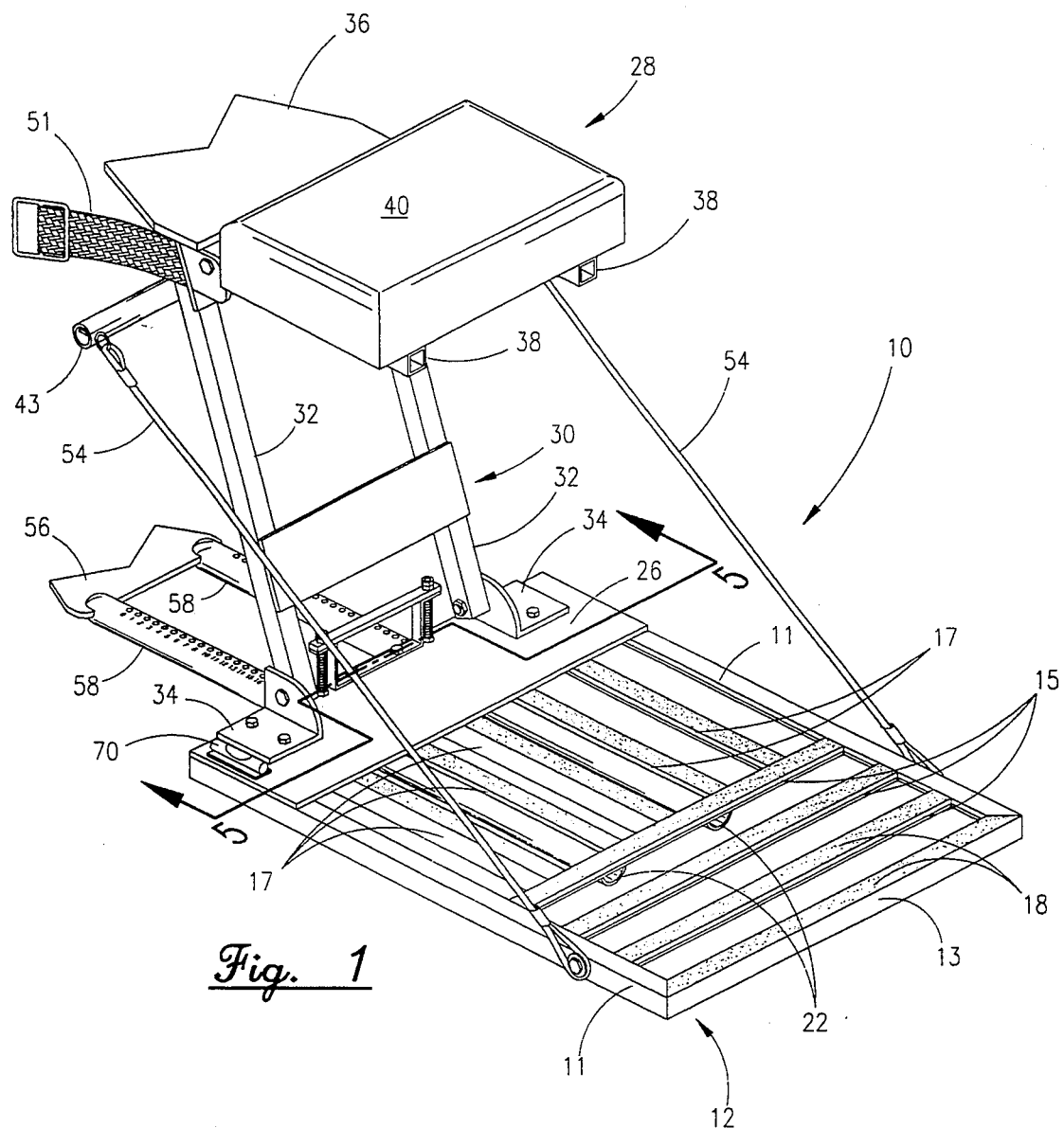
FIG. 1 is an isometric elevation view of the preferred embodiment.
Figure 1A:
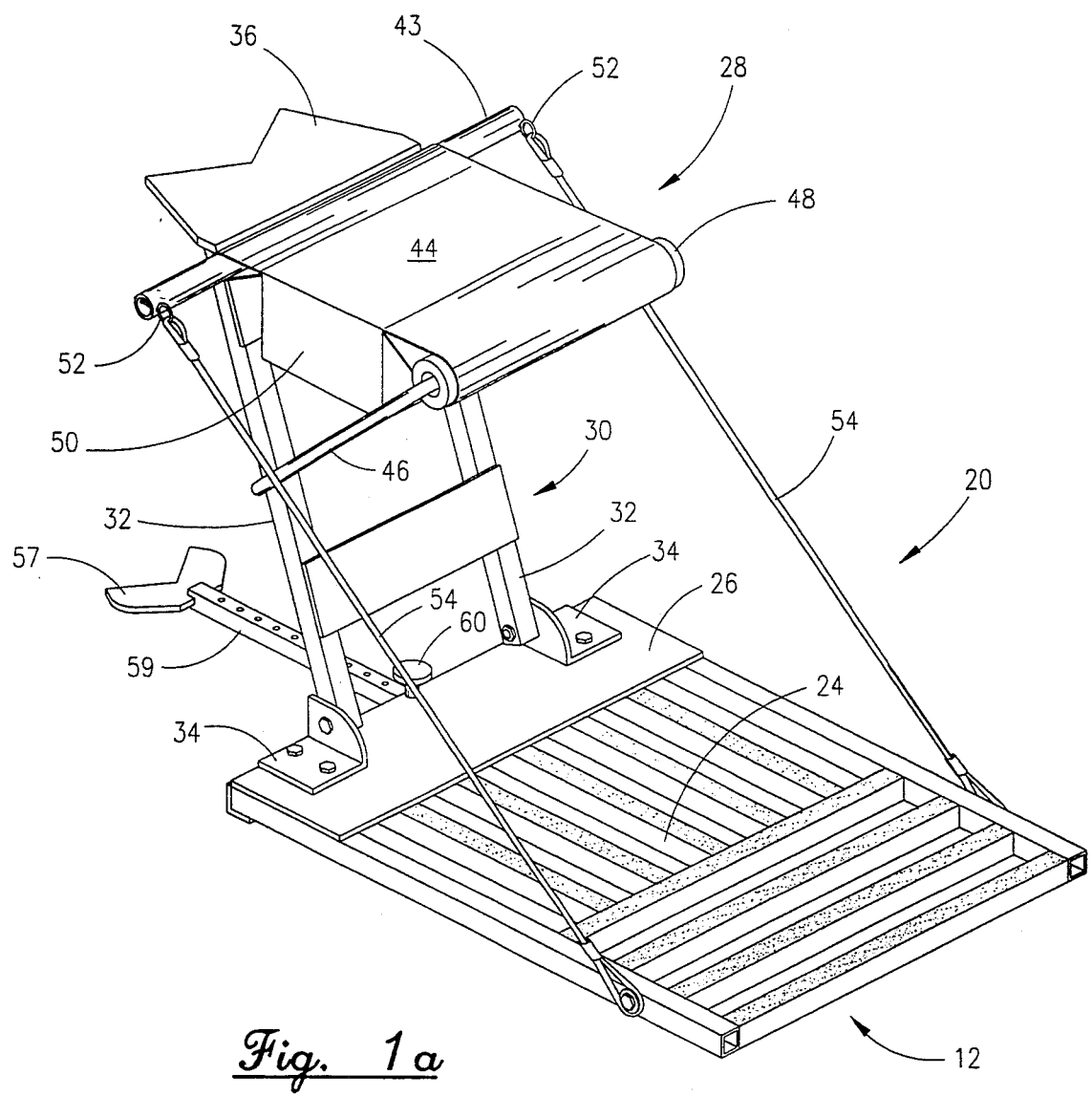
FIG. 1a is an isometric elevation of an alternative embodiment of the present invention.
Figure 2:
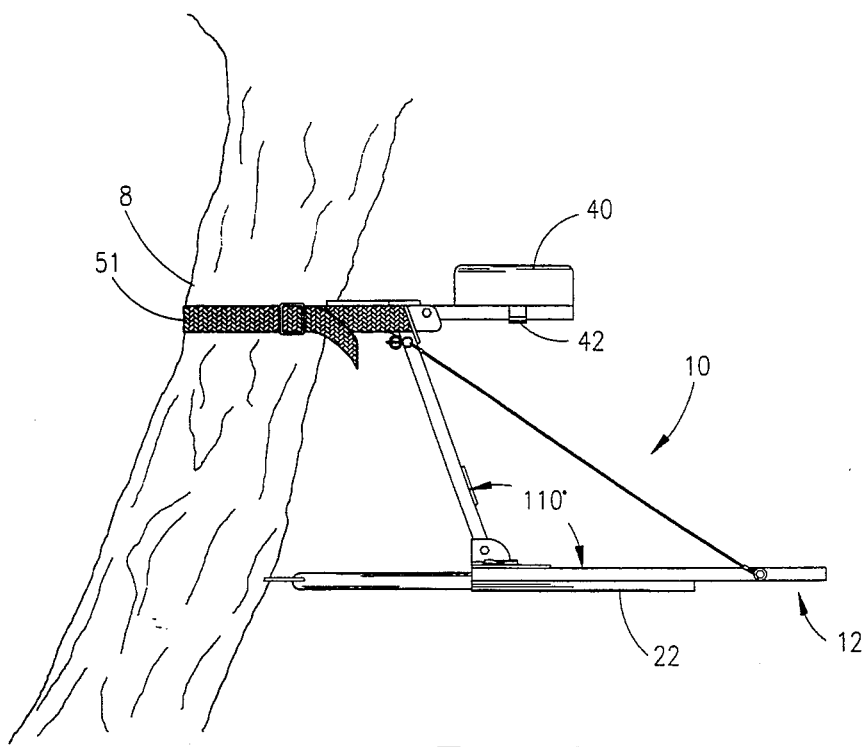
FIG. 2 is a side elevation of the present invention attached to a tree inclining toward the stand.
Figure 3:
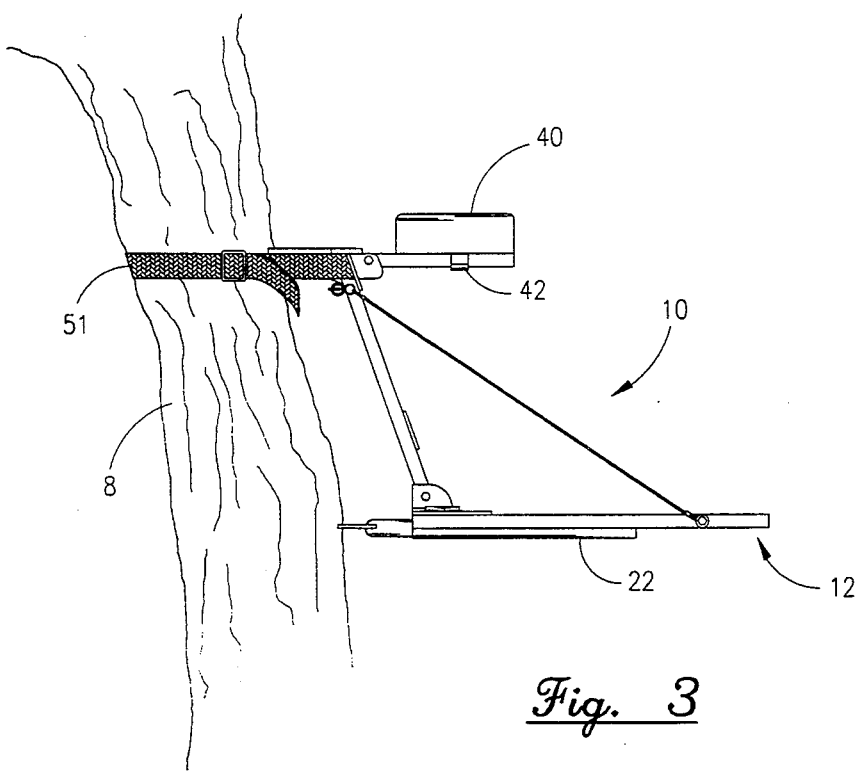
FIG. 3 is a side elevation of the present invention attached to a tree inclining away from the stand.
Figure 4:
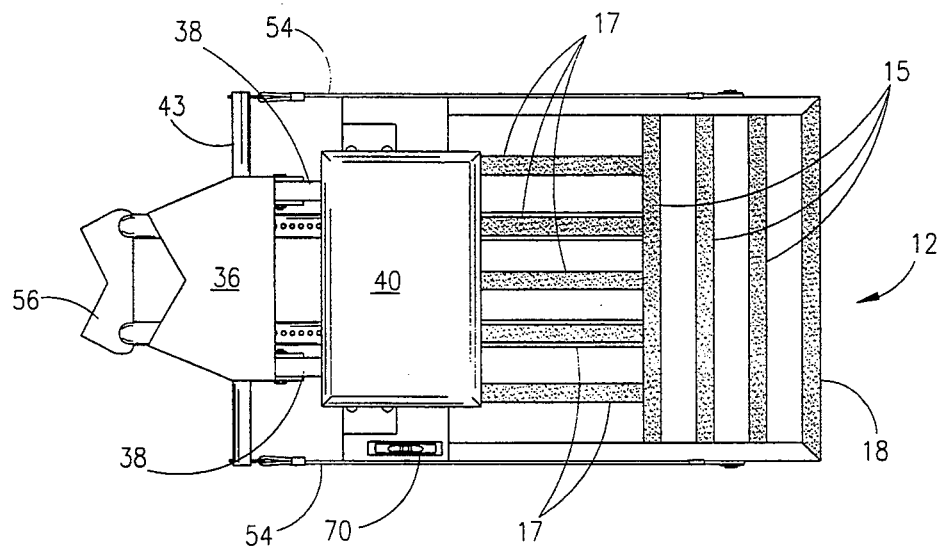
FIG. 4 is a plan view of the present invention.
Figure 5:
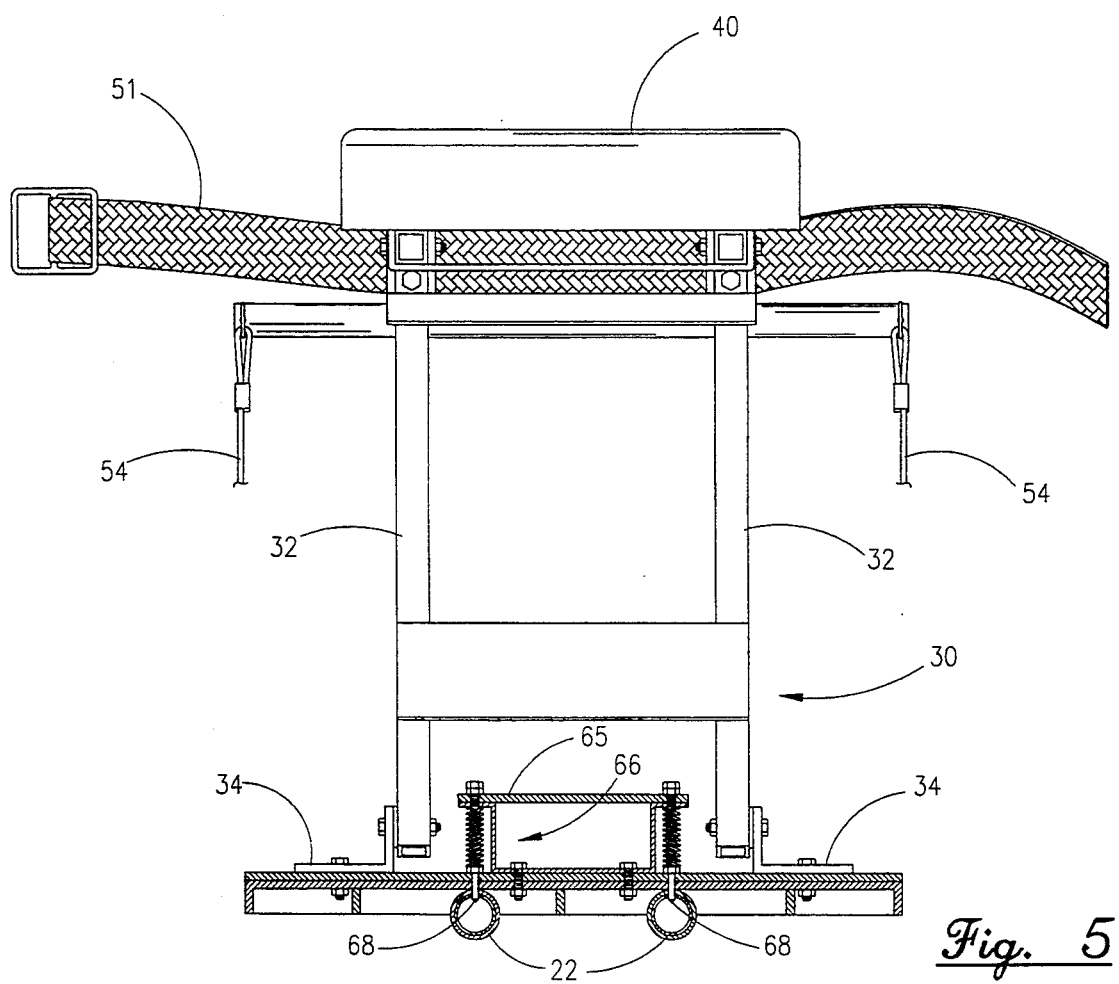
FIG. 5 is a partial cross section view taken along sight line 5—5 in FIG. 1.
Figure 6:
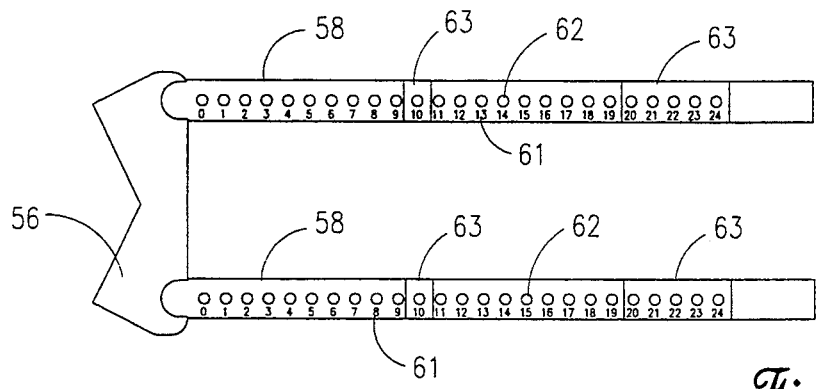
FIG. 6 is a plan view of the preferred embodiment's dual leg extender bar.
Figure 7:
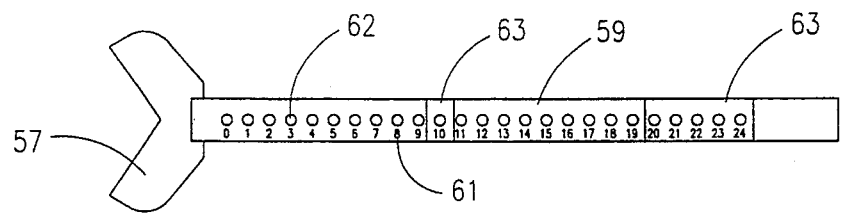
FIG. 7 is a plan view of the alternative embodiment's single leg extender bar.
Figure 8:
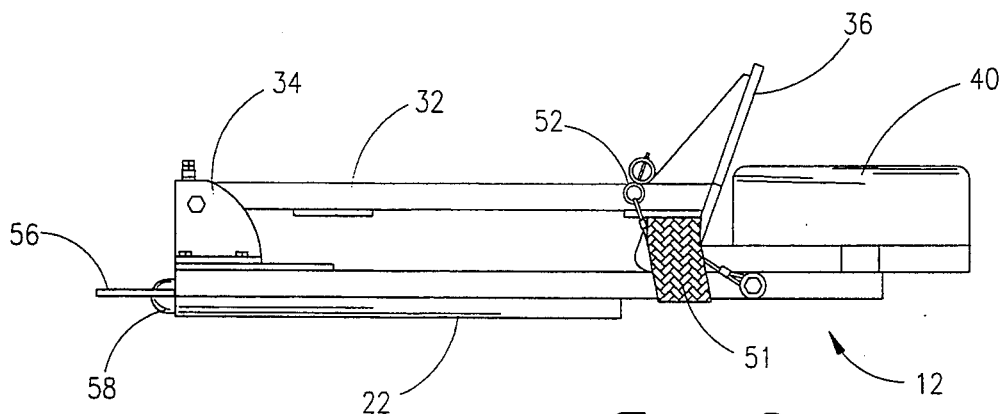
FIG. 8 is a side elevation of the preferred embodiment in the collapsed transportable position.

The preferred embodiment 10 as best seen in FIG. 1 illustrates the use of an unusual base frame 12 which is wider than most stand frames as a result of the use of lightweight aluminum angle bars. The base frame 12 is rectangular shaped having a pair of long side rails 11 and a pair of shorter rails 13 forming the perimeter of the frame 12. The cross decking members 15 running perpendicular to the side rails 11 allow a clear view of the ground below the stand 10. While the cross deck members 17 run parallel to the side rails 11 and are spaced closer together to provide positive footing. All cross decking members are faced with non-skid material 18. If cross member decking is used in place of expanded metal, it is essential that the cross decking members 17 be parallel to the side rails 11 in order to accommodate the two telescopic tubes 22 best seen in FIG. 5 which are located below and integrally with the two center most deck members 17. A single telescopic tube 24 centrally located can be used as seen in FIG. 1(a) as an alternative embodiment. Box tubing can also be used equally as well for the base frame 12 of stand 20 in alternative embodiment FIG. 1(a). In either embodiment 10 or 20, a deck plate 26 provides a mounting pad for the seat structure 28. The seat structure 28 is comprised of a pedestal 30 having a pair of legs 32 which are pivotal and removable mounted to the deck plate 26 by brackets 34. A vee-notched standoff plate 36 is provided at the upper end of the pedestal legs 32. The vee-notched plate 36 serves as the central pivot point of the stand 10, or 20. A pivotal seat frame 38 extending forward over the base frame 12 provides a mounting frame for a padded seat 40 secured in place by a belt 42. However, in the alternative embodiment 20, a canvas type seat 44 is provided which attaches to the cross bar 43 at one end and supported by a pivotal support arm 46 having a foam sleeve pad 48 at the opposite end. The canvas seat 44 is further equipped with a bag compartment 50 located beneath the seat for storage. A cross bar 43 attached to the upper end of the pedestal 30 provides anchor points 52 for a pair of flexible cables 54. When connected to the base frame 12, these cables maintain a fixed angle of approximately 110 degrees between the pedestal 30 and the base frame 12, as seen in FIGS. 2 and 3. A stand belt 51 attached to the upper portion of the pedestal 30 is provided to secure the stand 10, 20 to a tree 8 in the usual hang-on manner. A lower vee plate 56,57 adjustable member is provided having one or two adjustable telescopic tubes 58,59 attached, as seen in FIGS. 6 and 7, which are cooperative with the telescopic tubes 22, 24 mounted integrally within the base frame 12. However, the telescopic tubes 22, 58 or 59 and the lower vee plate 56 or 57 can be attached to almost any type tree stand. The adjustable telescopic member 58 or 59 has predrilled holes 62 drilled periodically along one wall of the tube, marked numerically 61 and color banded 63 to allow for incremental adjustment with respect to the fixed telescopic tubes 22 or 24. A manually adjustable screw handle 60 as seen in FIG. 1(a) threadably attached to the deck plate 26 can be used to penetrate the predrilled holes 62 in the adjustable telescopic members 58 or 59. A more elaborate adjusting means can be provided as best seen in FIG. 5 which relies on a pull bar 65 and spring bracket arrangement 66 which hold the lock pins 68 in contact with the telescopic tubes 58. To use the stand 10 or 20, the hunter simply fastens the belt 51 around the tree 8, thereby drawing the upper vee-plate 36 securely against the tree 8. As a result, the stand 10 or 20 is now held in a pivotal stand-off position with the tree 8. The base frame 12 is then pivotally rotated at bracket 34 until the side support cables 54 are fully extended. The hunter releases the incremental adjustment device 60 or 66 which allows the lower vee plate member 56 or 57 and its telescopic tubes 58 or 59 to be extended until a visual level has been established by viewing the sight level gauge 70. The incremental adjustment device 60 or 66 is then secured, locking the telescopic tubes 58 or 59 in position. The seat frame 38 can now be lowered to the level horizontal position. It should be noted that due to the upper vee-plate's 36 stand-off relationship with the tree 8 and the location of the seat 40, the hunter is positioned at a more comfortable distance from the tree trunk. It should also be noted that the seat 40 need not be in the horizontal position for the hunter to use the stand 10 or 20. The seat 40 can also be easily removed when leaving the stand for some period of time by simply loosening the belt 42 which attaches the seat 40 to the seat frame 38. As seen in FIG. 8 the stand 10 or 20 is completely collapsible for transport as a lightweight back pack.

List of terms:

1.
2.
3.
4.
5.
6.
7.
8. Tree
9.
10. preferred embodiment
11. side rails
12. base frame
13. shorter rails
14.
15. cross deck members (perpendicular)
16.
17. cross deck members (parallel)
18. non-skid
19.
20. alternative embodiment
21.
22. telescopic tubes (fixed)
23.
24. single telescopic tube (fixed)
25.
26. deck plate
27.
28. seat structure
29.
30. pedestal
31.
32. pedestal legs
33.
34. brackets
35.
36. (upper) vee notched stand-off plate
37.
38. pivotal seat frame
39.
40. padded seat
41.
42. seat belt
43. cross bar
44. canvas type seat
45.
46. pivotal support arm
47.
48. foam sleeve pad
49.
50. bag compartment
51. stand belt
52. anchor points
53.
54. flexible cables
55.
56. lower vee plate (dual)
57. lower vee plate (single)
58. adjustable telescopic tubes (dual)

-continued

List of terms:

59. adjustable telescopic tube
60. manual adjustment screw handle
61. numerical markings
62. predrilled holes
63. color banded
64.
65. pull bar
66. spring bracket
67.
68. lock pins
69.
70. sight level gauge
71.
72.
73.
74.
75.

What is claimed is:

1. A lightweight collapsible hunter's tree stand comprising:
   a) a base frame;
   b) a seat pedestal pivotally attached at one end to said base frame;
   c) an upper stand-off plate, parallel to said base frame attached to the opposite end of said pedestal and at an oblique angle to said pedestal;
   d) a seat frame pivotally attached at an oblique angle to said pedestal adjacent said upper stand-off plate, having an operable position whereby said seat frame remains parallel to said base frame regardless of a tree's incline;
   e) flexible restraining means attached to said pedestal and said base frame for maintaining a fixed angular displacement between said pedestal and said base frame greater than 90 degrees;
   f) a lower stand off means attached to said base frame for telescopically compensating for a tree's incline; and
   g) a belt means attached to said pedestal, adjacent said upper stand-off plate, for securing said pedestal to a tree.

2. A lightweight, collapsible, hunter's tree stand according to claim 1 wherein said flexible restraining means is a pair of cables the length of which is fixed to maintain an included angle between said pedestal and said base frame of approximately 110 degrees.

3. A lightweight, collapsible, hunter's tree stand according to claim 2 wherein said pair of cables are arranged parallel to each other.

4. A lightweight, collapsible, hunter's tree stand according to claim 3 wherein said upper stand-off plate serves as a spacer and pivot point between said pedestal and a tree.

5. A lightweight, collapsible, hunter's tree stand according to claim 4 wherein said seat frame further comprises a demountable padded seat secured to said seat frame by a belt.

6. A lightweight, collapsible, hunter's tree stand according to claim 5 wherein said lower stand-off means comprises: a at least one fixed tube attached to the lower side of said base frame; a least one tube telescopically cooperative within said fixed tube adjustable between a first retracted position and incrementally to a second fully extended position; and a vee-notched plate attached to the end of said adjustable tube.

7. A lightweight, collapsible, hunter's tree stand according to claim 6 wherein said adjustable tube is incrementally drilled, numerically marked and color banded to indicate mid-point and extension limitation.

8. A hunter's tree stand comprising:
   a) a base frame having a front and rear orientation;
   b) a pedestal pivotally attached at one end to the rear portion of said base frame;
   c) an upper vee-notched stand-off plate attached at the opposite end of said pedestal extending rearward;
   d) a seat frame pivotally attached opposite said vee-bracket, extending forward;
   e) a bar, located in near proximity to said upper vee-notched stand-off, fixed at its mid-point, perpendicularly to said pedestal;
   f) a pair of flexible supports with one end attached at each end of said bar and the opposite ends attached to each side of said base frame;
   g) a lower stand-off means telescopically adjustable, mounted integral with said base frame; and
   h) a belt means for securing said upper vee-notched stand-off plate to a tree.

9. A hunter's tree stand as defined in claim 8 wherein said base frame is comprised of:
   a) a pair of short members and a pair of long members forming a rectangular perimeter;
   b) a plurality of first cross deck members juxtaposed perpendicularly between said long members thereby comprising a front portion;
   c) a plurality of second cross deck men%hers juxtaposed perpendicular between one of said first cross members and one of said short perimeter members thereby comprising a rear portion deck member; and
   d) a biased plunger means reciprocally mounted on said rear portion deck members for selectively engaging a set of holes in at least one of said rear deck members for positioning said lower stand-off means between a first extended position and a second retracted position.

10. A hunter's tree stand as defined in claim 9 wherein said lower stand-off means is telescopically extendable from within at least one of said second cross deck members.

11. A hunter's tree stand as defined in claim 10 wherein said seat frame further comprises a seat removably attached by a belt.

12. A hunter's tree stand as defined in claim 9 wherein said flexible support means is a cable having a predetermined length which allows a maximum included angle of approximately 110 degrees between said pedestal and said base frame.

13. A hunter's tree stand as defined in claim 12 wherein said flexible support means are parallel.

14. A hunter's tree stand as defined in claim 9 wherein said base frame further comprises a visual level indicator.

* * * * *